United States Patent

Irby

[11] 3,955,822
[45] May 11, 1976

[54] ROD PUMP STUFFING BOX CONTROL SYSTEM

[75] Inventor: Richard Eugene Irby, Irving, Tex.
[73] Assignee: Dresser Industries, Inc., Dallas, Tex.
[22] Filed: Mar. 28, 1975
[21] Appl. No.: 563,287

[52] U.S. Cl. .................................. 277/2; 74/18.2
[51] Int. Cl.² ........................................ F16J 15/52
[58] Field of Search .................. 277/3, 4, 2, 32, 53, 277/103, 113, 114; 74/18.2

[56] References Cited
UNITED STATES PATENTS

| | | | |
|---|---|---|---|
| 3,129,009 | 4/1964 | Simpson | 277/4 |
| 3,180,134 | 4/1965 | Wadlington | 277/3 |
| 3,353,606 | 11/1967 | Dyer | 74/18.2 |

*Primary Examiner*—Robert I. Smith
*Attorney, Agent, or Firm*—Michael J. Caddell

[57] ABSTRACT

A system for maintaining a constant biasing pressure upon the sealing members of a rod pump stuffing box utilizes a hydraulic system under a constant preset pressure to bias the seal member into sealing engagement against the pump polished rod. Means are also disclosed for continuously monitoring the amount of wear undergone by the seal means and for actuating a warning light or shutting down the pumping unit when the seal means has undergone extensive wear or when leakage from the stuffing box has reached a predetermined level.

6 Claims, 1 Drawing Figure

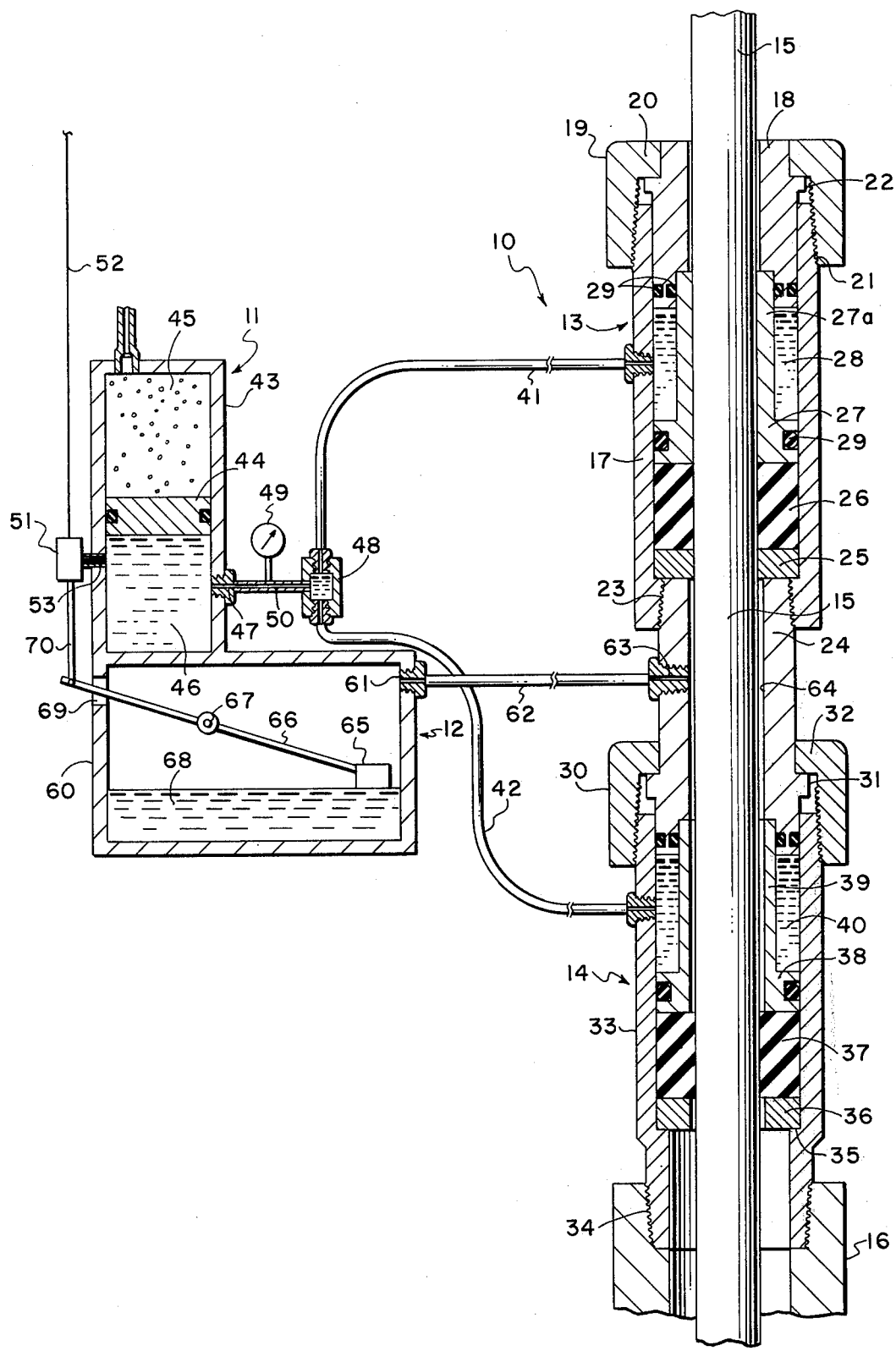

ROD PUMP STUFFING BOX CONTROL SYSTEM

BACKGROUND OF THE INVENTION

The present invention generally discloses a rod pump stuffing box and more specifically discloses a novel stuffing box having hydraulic and electrical systems for maintaining constant sealing adjustment of the packing seals in the stuffing box and further for signalling the operator and/or shutting down the pumping unit when the seals have deteriorated past a certain point or when a predetermined amount of leakage has escaped past the stuffing box seals.

Most conventional polished rod sealing devices are the type whereby the means for maintaining the packing seals in sealing engagement with the polished rod consists solely of manual adjusting devices. These stuffing box systems must be closely monitored by the well operator to prevent a loss of valuable well fluids and contamination of the surrounding environment.

This invention solves the problems of the prior devices by providing an automatic pressuring system designed to maintain relatively constant axial pressure upon the packing seals thereby continuously expanding them radially inward against the polished rod. The present invention also discloses means for continuously monitoring the condition of the seals and further contains means for collecting and monitoring the level of leaked well fluids escaping the lower packing seal, and for shutting down the system or signalling the operator, or both, when the seals have become worn extensively and/or the leakage past the lower packing seal has reached a certain predetermined volume.

BRIEF DESCRIPTION OF THE DRAWING

FIG. 1 is a partial cross-sectional schematic view of the rod pump stuffing box control system.

DESCRIPTION OF THE PREFERRED EMBODIMENTS

Referring now to the Figure, the stuffing box control system 10 is illustrated in cross-sectional side view as having hydraulic cylinder assembly 11, a leak container chamber assembly 12, an upper stuffing box seal assembly 13, and a lower stuffing box seal assembly 14. A reciprocating polished rod 15 is shown passing concentrically through the center of the wellhead assembly 13 and 14 and is connected at its upper end to a pump jack (not shown), with a mechanical pump (not shown) being attached at the lower end of rod 15 in the wellbore at the producing formation.

At the ground surface of the wellbore is the wellhead 16. Assemblies 14 and 13 are engaged in the upper end of wellhead 16 and arranged to encircle polished rod 15. Assembly 13 comprises a generally cylindrical packing housing 17 having an inner seal mandrel 18 slidably mounted therein. A threaded cylindrical cap 19 having an inward annular flange shoulder 20 is threaded upon the upper end 21 of housing 17 and is in abutting engagement with an outward annular shoulder 22 of mandrel 18. The lower threaded end 23 of housing 17 is engaged with a center sleeve 24. Located above sleeve 24 is a packing retainer ring 25 abuttingly engaged with housing 17 and sleeve 24 and urged against an annular elastomeric packing seal 26.

A piston sleeve 27 is located slidably and concentrically within housing 17 between mandrel 11 and the packing seal 26. Piston 27 has an upper skirt section 27a in slidable sealing engagement inside mandrel 18 and forming fluidic expansion chamber 28 inside housing 17. Circular elastomeric seals 29 provide sliding sealing engagement between the various components of upper assembly 13. Lower assembly 14 is substantially identical in structure to upper assembly 13.

Central sleeve 24 extends downward inside a lower cylindrical cap 30 and has an external abutment shoulder 31 held in clamping arrangement by an inwardly extending flange 32 of cap 30. Cap 30 is threadedly engaged to a lower cylindrical tubular housing 33 which at its lower end 34 is threadedly engaged in the wellhead. An abutment shoulder 35 is formed inside section 34 and contains in abutment therein a seal retaining ring 36 upon which is located a lower cylindrical packing seal 37. A slidable piston sleeve 38 having an upper piston skirt 39 is located concentrically within housing 33 and is in sealing slidable engagement with sleeve 24 and housing 33. The reduced diameter skirt section 39 serves in conjunction with housing 33 to create hydraulic expansion chamber 40.

The upper piston 27 and the lower piston 38 are each arranged within the upper and lower housings to receive fluidic pressure thereon from chambers 28 and 40 and, in response to said pressure, to be driven downward against the respective packing seals thereby axially compressing the packing seals inward against the polish rod 15. Hydraulic fluid for actuating pistons 27 and 38 is supplied by means of conduits 41 and 42 to the respective fluid piston chambers 28 and 40. The hydraulic fluid is pressurized in the piston assembly 11 which comprises a tubular cylinder 43 in which is slidably and sealingly located a disc type piston member 44. Piston 44 divides cylinder 43 into an upper expansion chamber 45 and a lower hydraulic chamber 46. Hydraulic fluid is placed in chamber 46 and communicated by means of an outlet 47 with a fluid manifold 48 arranged to supply fluid simultaneously to conduits 41 and 42.

A hydraulic pressure gauge 49 is placed in communication with the outlet tube 50 to provide constant visual read-out of the hydraulic pressure within the system. A compressed gas supply may be utilized to fill chamber 45 at a constant predetermined pressure. After chamber 45 has beem filled to the desired pressure, the gas supply may be removed. This pressure acts upon piston 44 and pressurizes fluid in chamber 46. The pressurized fluid then moves via conduits 41 and 42 into the piston chambers 28 and 40 to apply the requisite axial compression to the packing seals 26 and 37.

Due to the large volume of gas in chamber 45 and the large piston area of piston 44, the change in pressure in chamber 45 as the piston moves downward will be relatively small compared to the amount of compression gained in the upper and lower packing seals. This is further appreciated when it is realized that the wear on the packing seals will allow such a small amount of piston movement, that for all practical purposes the pressure in chamber 45 will remain substantially constant over an extended period of time; but as the packing seals begin to wear a great amount, then movement of piston 44 will become substantial. It is this substantial movement of piston 44 which will be used to indicate the extensive wear of the packing seals 26 and 37. For instance, in one embodiment of the invention, the pressure within chamber 46, being the same as pressure in chamber 45, is constantly monitored by a pressure switch 51 communicating with the fluid in chamber 46. When the pressure in chamber 46 decreases below a predetermined limit, then pressure switch 51 is actuated and a signal is generated through signal lead 52 to a warning light and/or the power supply to the pumping unit. The generated signal may be used to light a signal beam to indicate to the operator that extensive wear in the packing seals has occurred, or the signal may be used alternatively or simultaneously to shutdown power to the pumping unit until repair or replacement of the packing seals can be accomplished.

Alternatively, unit 51 may comprise a proximity switch arranged to be actuated by movement of piston 44 into close proximity to sensor 53 located in the wall of cylinder 43. The proximity switch could be of the type utilizing magnetic means energized by a magnetic element located in the disc 44, which magnetic means generates the warning or shutdown signal communicated to conduit 52.

In conjunction with the automatic packing seal adjustment features described above, there is also a leak containment assembly 12 having a relatively large enclosed fluidic chamber 60 with fluid inlet 61 connected by means of fluid conduit 62 to a fluid leak outlet 63 in the wall of central sleeve 24, which outlet 63 communicates with the annular space 64 between sleeve 24 and rod 15. Fluid being pumped from the well which manages to bypass the lower packing seal 37, will be forced through outlet 63, conduit 62 and into fluid collection chamber 60.

A buoyant float 65 secured to a rod 66 which is pivotally mounted at 67 within chamber 60 is arranged to be responsive to the level of leaked fluid 68 which accumulates in chamber 60. The float 65 is designed to be buoyant in the well fluid 68 and rod 66 is designed to extend through a vertical slot 69 in the wall of chamber 60 and contains an upper signal arm 70 operatively connected to signal switch 51. The float system is designed to actuate switch 51 when the level of fluid reaches a certain predetermined height. The signal generated by such actuation of switch 51 can either light a signal lamp or shut-off power to the prime-mover on the pump jack, or do both.

METHOD OF OPERATION

In typical operation, the pump rod stuffing box is installed on the wellhead and the upper and lower packing seals 26 and 37 are adjusted by tightening or loosening of the adjusting caps 19 and 30. These caps are threadedly engaged and move downward on their respective housings 17 and 33 until the packing seals have been expanded radially inward into sealing engagement with the sucker rod 15. The hydraulic control system is then filled with fluid and the gas pressure chamber 45 is filled until the desired precharge pressure is obtained.

As an alternative to the gas biasing pressure of chamber 45, a spring system may be used in place thereof. As a second alternative, a combination of spring biasing means in gas pressure may be utilized upon piston 44 to apply a given pressure to the hydraulic fluid of chamber 46. The precharged pressure of the hydraulic control fluid may be adjusted until the desired polished rod seal pressure is obtained. This pressure is read on pressure gauge 49 and may be recorded for later reference.

After the pump is started and has begun to operate, the packings will begin to wear. The action of the hydraulic control fluid pressure on the packing pistons will maintain the packing seals in sealing abutment against the polish rod. It should be noted that the large precharged gas volume remains substantially constant because of the relatively small amount of movement required in the pistons 27 and 38 to obtain the necessary axial expansion of seals 26 and 37. After an extended period of pump operation, however, the packing seals will begin to suffer extreme wear. At this time, the piston 44 will have moved downward into chamber 46 a relatively substantial amount.

This results in a significant lowering of the pressure in chambers 45 and 46, which change in pressure is sensed by sensor 53 and serves to actuate switch 51 generating the command signal through conduit 52, either to the warning light or the prime-mover on the pump jack. Alternately, significant movement of piston 44 downward resulting from high degree of wear of the packing seals may be utilized to actuate the aforementioned proximity switch at location 53 attached to switch 51 and conduit 52 to achieve the same warning and/or shutdown of the pump jack.

The lighted signal light or shutdown pumping unit indicates to the operator that the packing seals have worn beyond the point of automatic adjustment and either should be replaced or further mechanical adjustment via caps 30 and 19 needs to be carried out. If the seals may be retained in the stuffing box system, the mechanical adjustment by means of caps 19 and 30 is carried out until the pressure reading at gauge 49 returns to the original preset desired pressure. This indicates that the seals are again contacting the sucker rod with the proper amount of sealing contact.

Conversely, if the packing seals are to be replaced, this is achieved by moving the packing caps and the pistons and replacing the worn seals with new seal units. Then the pistons and caps are replaced on the seal units, the hydraulic system is recharged, and the mechanical tightening is performed until the desired pressure reading at gauge 49 is obtained. If the unit has been shutdown or the signal lamp lighted because of the high level of leakage collected in chamber 60, then the chamber can be drained off into a receptacle and the pressure of the hydraulic system checked at gauge 49. Should the system need repressuring, this may be achieved by the tightening of caps 19 and 30 and the system placed back into operation again.

Although certain preferred embodiments of the invention have been herein described in order to provide an understanding of the general principles of the invention, it will be appreciated that various changes and innovations can be affected in the described rod pump stuffing box and sealing system without departing from these principles. For example, the present invention could be utilized with only a lower packing seal and the upper seal system removed. Furthermore, various other sensing systems such as micro-switches could be used in the fluid leak collection chamber to sense the level of the fluid therein. The invention, therefore, is declared to cover all changes and modifications of the specific example of the invention herein disclosed for purposes of illustration, which do not constitute departures from the spirit and scope of the invention.

The embodiments of the invention in which an exclusive property or privilege is claimed are defined as follows:

1. A rod pump wellhead sealing system comprising:

a stuffing box adapted to be attached to a wellhead and encircle a sucker rod, and arranged to allow reciprocal motion of the sucker rod therethrough;

seal means in said stuffing box arranged to peripherally contact an inner wall of said stuffing box and a sucker rod passing through said stuffing box;

piston means adjacent said seal means and arranged to apply axial compression thereto, said piston means having pressure response area means thereon; and, pressure means for applying continuous fluidic pressure to said piston means, said pressure means further comprising a hydraulic assembly having a relatively large piston in a hydraulic cylinder with biasing means in said cylinder acting on one side of said piston, and hydraulic fluid on the opposite side of said piston, said hydraulic fluid adapted to receive pressure force from said piston and said assembly having conduit means communicating said fluid to said pressure response area means on said piston means.

2. The sealing system of claim 1 further comprising sensing means in said hydraulic assembly for sensing extensive movement of said piston therein, and signal generating means operably connected to said sensing means and arranged to generate a signal in response to actuation of said sensing means.

3. The sealing system of claim 1 further comprising:

container means for collecting and retaining well fluid leaking past said seal means in said stuffing box; and, conduit means for communicating said container means with said stuffing box above said seal means.

4. The sealing system of claim 3 further comprising fluid level sensor means in said container means, said fluid level sensor means being operably connected to signal means adapted to generate a signal in response to a predetermined level of fluid in said container means.

5. A wellhead stuffing box assembly with seal adjusting and monitoring system, said stuffing box assembly comprising:

a generally cylindrical tubular stuffing box housing assembly adapted to be attached to a wellhead and arranged to allow reciprocal movement of a polished rod string therethrough;

circular seal means in said housing assembly arranged to sealingly engage said housing and for sealing and slidable contact with a polished rod string passing therethrough;

circular piston means slidably located inside said housing assembly in abutment with said seal means and having pressure response means thereon;

hydraulic pressure means communicating with said pressure response means and arranged to provide pressurized fluid to move said piston means into compressive abutment with said seal means;

sensing means for determining when said seal means has been compressed a predetermined amount; and, signal means for generating a signal in response to said predetermined amount of compression.

6. The stuffing box assembly of claim 5 further comprising means for collecting well fluids leaking past said sealing means, and fluid level sensor means in said collecting means for sensing when the fluid level therein reaches a predetermined level; said fluid level sensor means being operably connected to said signal means.

* * * * *